United States Patent
Kotori et al.

(10) Patent No.: US 8,394,884 B2
(45) Date of Patent: Mar. 12, 2013

(54) COATING MATERIAL AND CONTAINER COATED WITH THE COATING MATERIAL

(75) Inventors: Yuichi Kotori, Ibaraki (JP); Juichirou Kawabata, Ibaraki (JP); Naoki Fujisawa, Ibaraki (JP); Keiji Hamamoto, Ibaraki (JP); Takahiro Yamaguchi, Ibaraki (JP); Takashi Kashimoto, Amagasaki (JP); Shinji Hiramoto, Amagasaki (JP)

(73) Assignees: Taisei Kako Co., Ltd., Osaka (JP); Shionogi & Co., Ltd., Osaka (JP)

(*) Notice: Subject to any disclaimer, the term of this patent is extended or adjusted under 35 U.S.C. 154(b) by 60 days.

(21) Appl. No.: 13/002,257

(22) PCT Filed: Jun. 26, 2009

(86) PCT No.: PCT/JP2009/061756
§ 371 (c)(1),
(2), (4) Date: Dec. 30, 2010

(87) PCT Pub. No.: WO2010/001835
PCT Pub. Date: Jan. 7, 2010

(65) Prior Publication Data
US 2011/0097525 A1    Apr. 28, 2011

(30) Foreign Application Priority Data
Jul. 1, 2008 (JP) .................... 2008-172279

(51) Int. Cl.
C08K 3/20 (2006.01)
C08F 220/04 (2006.01)

(52) U.S. Cl. ...................... 524/501; 524/379

(58) Field of Classification Search .................. 524/501
See application file for complete search history.

(56) References Cited

U.S. PATENT DOCUMENTS

| | | | |
|---|---|---|---|
| 6,096,376 A | 8/2000 | Yamamoto et al. | |
| 6,357,871 B1 * | 3/2002 | Ashida et al. ................. | 347/106 |
| 7,112,625 B2 | 9/2006 | Nakayama et al. | |
| 7,166,667 B2 * | 1/2007 | Bakule .......................... | 524/501 |
| 7,544,414 B2 | 6/2009 | Tsutsumi et al. | |
| 7,666,941 B2 | 2/2010 | Shiba et al. | |
| 7,772,318 B2 | 8/2010 | Fasano et al. | |

FOREIGN PATENT DOCUMENTS

| CN | 1646624 A | 7/2005 |
|---|---|---|
| CN | 1791634 A | 6/2006 |
| EP | 1508438 A1 | 2/2005 |
| EP | 1710284 A1 | 10/2006 |
| JP | 54046644 U | 3/1979 |
| JP | 63151385 A | 6/1988 |
| JP | 6009843 A | 1/1994 |
| JP | 10157750 A | 6/1998 |
| JP | 2002194284 A * | 7/2002 |
| JP | 2002347183 A | 12/2002 |
| JP | 2004067719 A | 3/2004 |
| JP | 2006096381 A | 4/2006 |
| JP | 2007031639 A | 2/2007 |
| WO | 9421537 A1 | 9/1994 |
| WO | 9814384 A1 | 4/1998 |

OTHER PUBLICATIONS

Translation of JP 2002-194284, Jul. 2002.*

* cited by examiner

*Primary Examiner* — Hui Chin
(74) *Attorney, Agent, or Firm* — The Webb Law Firm

(57) ABSTRACT

A coating material includes a first aqueous dispersion (A) and a second aqueous dispersion (B) wherein a dispersoid of the first aqueous dispersion (A) has an average particle diameter of 1 to 20 μm and a dispersoid of the second aqueous dispersion (B) has an average particle diameter $1/100$ to $1/5$ of that of the dispersoid of the first aqueous dispersion (A), and the mass ratio (the aqueous dispersion (A)/the aqueous dispersion (B)) of the dispersoid of the first aqueous dispersion (A) to the dispersoid of the second aqueous dispersion (B) is 2/1 to 100/1. Also provided is a container, which is coated with the coating material and has excellent properties.

12 Claims, 1 Drawing Sheet

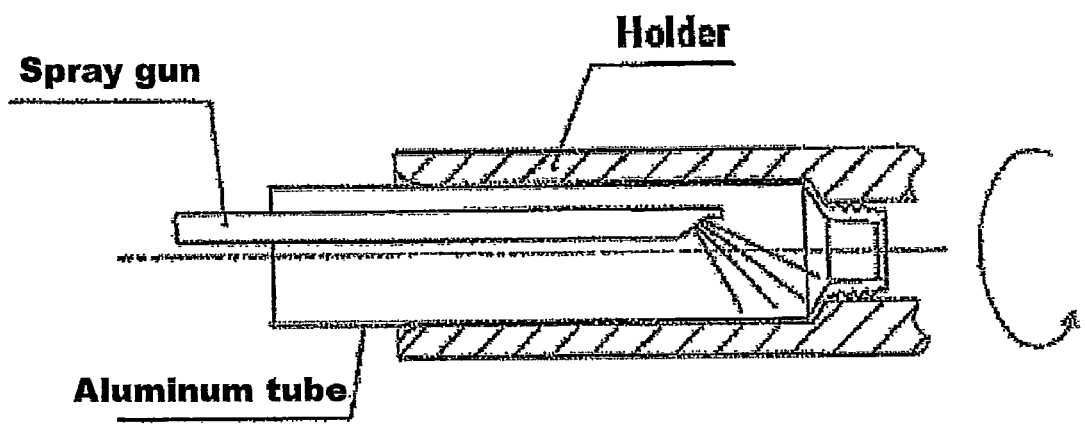

COATING MATERIAL AND CONTAINER COATED WITH THE COATING MATERIAL

TECHNICAL FIELD

The present invention relates to coating materials and containers coated with the coating materials.

TECHNICAL BACKGROUND

As containers for containing various contents such as cosmetics, chemicals, foods and the like, containers having a resin layer on the inner side thereof have been conventionally used. The resin layer protects the container from the content contained therein. When the resin layer is formed on the inner surface of the container, for example, a coating material comprising a component obtainable by dispersing a resin in an aqueous medium (hereinafter referred to as "aqueous dispersion") is used. The coating materials include a coating material comprising an aqueous dispersion of a polyolefin such as polyethylene etc. and the resin layer formed from the coating material has excellent flexibility, chemical resistance and other properties.

As containers having such a resin layer, for example, Patent document 1 discloses a tube-type container having a polyethylene-coating layer formed by spray coating a polyethylene aqueous dispersion on the most inner layer of an aluminum tube. However, forming the polyethylene aqueous dispersion requires addition of a surfactant in order to disperse polyethylene, which is hydrophobic, in water. The surfactant remains in the resin layer even after drying with heat because of low volatility thereof. The surfactant remained in the resin layer elutes from the resin layer to a content with the elapse of time and adversely affects the content. Furthermore, the coating material of a polyethylene aqueous dispersion is generally difficult to form a uniform resin layer and sometimes causes pinholes or bubbles in the resin layer. Moreover, conventional coating materials of a polyethylene aqueous dispersion having a high viscosity have a problem in paintability (handling properties) such that in performing coating with a spray method, a nozzle for injecting the coating material is easily clogged with the coating material. The resin layer formed by polyethylene, further, has low adhesion strength with containers made of aluminum etc. Sometimes, the resin layer is therefore peeled off and the containers are thereby corroded by the content.

Patent document 2 discloses that a dried coating film of a polyolefin resin dispersing aqueous solution is used as a under coating film for coating and the like. It also discloses that an ionomer resin is suitable as the above polyolefin resin, in order to improve the adhesion with metals. However, the resin layer formed from the ionomer resin generally has inferior chemical resistance and heat resistance and also has a problem of being easily corroded.

On the inner surface of an aluminum tube on the market, a resin layer formed from an epoxy compound is generally provided. Since the epoxy compound contains detrimental substances such as bisphenol A, which is one kind of endocrine disrupting chemicals, and the like, the detrimental substances eluted adversely affect on the content of the tube, in the case of eluting from the resin layer.

DOCUMENTS OF RELATED ART

Patent Documents

Patent document 1: Japanese utility model-A-S54(1979)-46644
Patent document 2: JP-A-S63(1988)-151385

SUMMARY OF THE INVENTION

It is an object of the present invention to provide a coating material, which has excellent chemical resistance and heat resistance, does not contain detrimental substances such as VOC (volatile organic compounds), endocrine disrupting chemicals and the like and further has excellent paintability. It is another object of the invention to provide containers having excellent properties and being coated with the coating material.

SUMMARY OF THE INVENTION

The present inventors have earnestly been studied in order to solve the above problems associated with the related arts, and have found that a coating material comprising, in specific amounts, two kinds of aqueous dispersions which differ from each other in the average particle diameters of dispersoids thereof is capable of giving a coating material having excellent properties such as chemical resistance, heat resistance and the like and also having paintability to the inner surface of a container. Thus, the present invention has been accomplished.

That is to say, the coating material of the present invention comprises a first aqueous dispersion (A) and a second aqueous dispersion (B) wherein a dispersoid of the first aqueous dispersion (A) has an average particle diameter of 1 to 20 μm and a dispersoid of the second aqueous dispersion (B) has an average particle diameter $1/100$ to $1/5$ of that of the dispersoid of the first aqueous dispersion (A), and the mass ratio (aqueous dispersion (A)/aqueous dispersion (B)) of the dispersoid of the first aqueous dispersion (A) to the dispersoid of the second aqueous dispersion (B) is 2/1 to 100/1.

The dispersoid of the first aqueous dispersion (A) preferably is formed from particles of a polyolefin and an acid modified polyolefin, and the dispersoid of the second aqueous dispersion (B) preferably is acid modified polyolefin particles.

Furthermore, the dispersion medium of the first aqueous dispersion (A) or the second aqueous dispersion (B) is preferably at least one selected from the group consisting of water and alcohols having 1 to 4 carbon atoms.

The coating material of the present invention preferably further comprises a solvent in an amount of 1 to 20% by mass. The solvent is more preferably a water-soluble organic compound having a boiling point of 100 to 200° C.

Preferably, the coating material of the present invention substantially does not contain a surfactant.

The coating material of the present invention preferably has a viscosity, as determined by a flow cup No. 3 in accordance with JIS K5600-2-2, of 80 to 400 sec.

The container of the present invention has a layer (X) formed by applying the coating material on the inner surface of the container. The container is preferably made of a metal, more preferably aluminum. The container is preferably a tube, more preferably a tube having a mouth, which is a closed film.

The layer (X) has a thickness of preferably 2 to 50 μm.

The layer (X) is preferably formed by a coating method using a spray gun.

According to the coating material of the present invention, favorable coating can be performed stably by various conventional coating methods. Particularly in coating with the spray method, clogging in a nozzle for coating material injecting can be suppressed and thereby very favorable coating can be performed. Furthermore, according to the coating material of the present invention, a uniform resin layer can be formed with low occurrence of pinholes, bubbles and the like and also can form a resin layer having excellent adhesion with the inner surface of a container. Moreover, the container having the resin layer excellent in chemical resistance, heat resistance and other properties in the inner surface thereof can be prepared. The resin layer can suppressed corrosion of a container caused by contents, for example, chemicals, cosmetics, foods, hair conditioners, hair colors or adhesives. The container with the above resin layer is a favorable container for containing and preserving the above contents.

BRIEF DESCRIPTION OF THE DRAWING

The drawing is a view showing one example of a method of forming a layer (X) using a spray gun.

EMBODIMENTS FOR CARRYING OUT THE INVENTION

The coating material of the present invention comprises a first aqueous dispersion (A) and a second aqueous dispersion (B).

The dispersoid of the first aqueous dispersion (A) has an average particle diameter of 1 to 20 μm, preferably 1 to 15 μm, more preferably 1 to 10 μm.

The dispersoid of the second aqueous dispersion (B) has an average particle diameter of $1/100$ to $1/5$, preferably $1/80$ to $1/20$, more preferably $1/60$ to $1/40$ of that of the dispersoid of the aqueous dispersion (A). The average particle diameter of the dispersoid of the aqueous dispersion (B) is not particularly limited as long as it satisfies the above conditions, and for example, is preferably 0.01 to 0.9 μm, more preferably 0.05 to 0.5 μm, particularly preferably 0.08 to 0.1 μm.

When the average particle diameter of the dispersoid of the aqueous dispersion (A) is over the upper limit, the stability of the aqueous dispersion tends to be worse. In the case that the average particle diameter of the dispersoid of the aqueous dispersion (A) is over the upper limit, in order to keep the stability of the aqueous dispersion, the aqueous dispersion needs to contain large amounts of an organic solvent having a low density and a thickening agent in addition to the dispersing medium. The use of large amounts of the organic solvent having a low density and the thickening agent such as dimethyl cellosolve, ethylene glycol and the like is not preferable because of giving a large load to the environment.

When the average particle diameter of the dispersoid of the aqueous dispersion (A) is less than 1 μm, it is necessary to set the average particle diameter of the dispersoid of the dispersion (B) to be small, for example, less than 0.01 μm. However, it is technically difficult to prepare a dispersoid having such a small average particle diameter.

The mass ratio (aqueous dispersion (A)/aqueous dispersion (B)) of the dispersoid of the aqueous dispersion (A) to the dispersoid of the aqueous dispersion (B) is 2/1 to 100/1, preferably 10/1 to 60/1, more preferably 20/1 to 40/1.

In the case that the average particle diameters of the dispersoids of the aqueous dispersions (A) and (B) are in the above range and that the mass ratio of the dispersoids of the aqueous dispersions (A) and (B) in the above range, the properties of the coating material such as viscosity, surface tension, etc. can be controlled in the proper ranges in accordance with various coating methods and thereby the paintability of the coating material become favorable. The coating can be carried out without liquid cissing with low occurrence of pinholes, bubbles and the like to form a uniform resin layer. For example in the coating method using a spray gun, clogging of a nozzle for coating material injection and liquid sagging are suppressed and thereby the paintability are very favorable. Particularly, when the inner surface of an aluminum tube whose mouth is a closing film is coated by a spray gun, a favorable resin layer can be formed even in the mouth, which is a closing film part, where it is difficult to apply the coating material.

Although reasons for these as described above are not clear, the present inventors have presumed as follows. That is, since dispersoids having a small average particle diameter are interposed between dispersoids having a large average particle diameter to act as a lubricant, the viscosity, surface tension and other properties of a coating material can be improved remarkably and the paintability can be also improved in accordance with various coating methods. Furthermore, since the dispersoids having a small average particle diameter are interposed between the dispersoids having a large average particle diameter to fill in the gaps of the particles, pinholes, bubbles and the like are less frequently occurred, and thereby a uniform resin layer can be formed.

Incidentally, the average particle diameter is determined by the measuring method as described later in the examples, in the present invention.

The dispersoid of the aqueous dispersion (A) is preferably formed from particles formed from a polyolefin and an acid modified polyolefin (hereinafter optionally referred to as "polyolefin mixed particles"). The polyolefin mixed particles can be produced by a known method. For example, there is a method in which the polyolefin and the acid modified polyolefin are separately prepared and then mixed. Specific examples are a method of mixing powders or pellets of the polyolefin and acid modified polyolefin by a mixing machine such as Henschel mixer etc. to prepare a mixture in advance and melting the mixture with heat, and a method of directly introducing the polyolefin and the acid modified polyolefin into a drum, an extruder or the like and mixing them while melting with heat.

When the dispersoid of the aqueous dispersion (A) is particles formed from the polyolefin and the acid modified polyolefin, in the case that the dispersing medium is water as a main component, a stable aqueous dispersion can be formed without adding a surfactant. Therefore, the resin layer formed from the coating material containing the aqueous dispersion (A) does not contain detrimental substances derived from the surfactant, and is free of adverse effects caused by eluting the detrimental substances.

Examples of the polyolefin, which is not particularly limited as long as within the range of the object of the present invention, are an α-olefin homopolymer and a copolymer of two or more α-olefins.

Specific examples of the α-olefin are ethylene, propylene, butene-1, pentene-1, 2-methylbutene-1, 3-methylbutene-1, hexene-1, 3-methylpentene-1, 4-methylpentene-1, 3,3-dimethylbutene-1, heptane-1, methylhexene-1, dimethylpentene-1, trimethylbutene-1, ethylpentene-1, octene-1, methylpentene-1, dimethylhexene-1, trimethylpentene-1, propylpentene-1, decene-1, methylnonene-1, dimethyloctene-1, trimethylheptene-1, ethyloctene-1, methylethylheptene-1, diethylhexene-1, dodecene-1, and hexadodecene-1.

Specific examples of the α-olefin homopolymer and the copolymer of two or more α-olefins are polyethylene, polypropylene, poly-1-butene, poly-4-methyl-1-pentene, ethylene-propylene copolymer, ethylene-1-butene copolymer and propylene-1-butene copolymer.

As the polyolefin, polyethylene and polypropylene are more preferable and polyethylene is particularly preferable.

The polyolefin may be one or a combination of two or more of the above polymers.

The polyolefin preferably has a molecular weight such that the intrinsic viscosity $[\eta]$ is 0.05 to 5 dl/g. When the intrinsic viscosity $[\eta]$ is over 5 dl/g, the resulting polyolefin mixed particles have high viscosity and thereby are difficultly dispersed. On the other hand, when it is less than 0.05 dl/g, the mechanical strength of the polyolefin is lowered and the viscosity of the resulting polyolefin mixed particles is too lowered, with the result that the polyolefin mixed particles are difficult to be sheared in dispersing and that spherical particles having a small particle diameter are hardly prepared.

When such a polyolefin is used, the resin layer formed from the coating material containing the polyolefin has excellent properties such as chemical resistance and flexibility.

Usable examples of the acid modified polyolefin, which are not particularly limited as long as within the object of the present invention, are a copolymer of the α-olefin and an unsaturated carboxylic acid or its anhydride and a copolymer obtainable by grafting an unsaturated carboxylic acid or its anhydride on the olefin polymer.

As the unsaturated carboxylic acid or its anhydride for constituting the acid modified polyolefin, a monocarboxylic acid and a dicarboxylic acid and its anhydride are usually used. Specific examples of the unsaturated carboxylic acid or its anhydride are α,β-unsaturated carboxylic acids such as acrylic acid, methacrylic acid, crotonic acid, isocrotonic acid, α-ethyl acrylic acid, maleic acid, fumaric acid, itaconic acid citraconic acid, tetrahydrophthalic acid, methyltetrahydrophthalic acid, endocis-bicyclo[2.2.1]-hepto-5-ene-2,3-dicarboxylic acid (trade name: Nadic acid) and methyl-endocis-bicyclo[2.2.1]hepto-5-ene-2,3-dicarboxylic acid, and their anhydrides.

The acid modified polyolefin has a molecular weight such that the intrinsic viscosity $[\eta]$ is usually 0.05 to 3 dl/g, preferably 0.06 to 0.8 dl/g. In the present invention, the intrinsic viscosity $[\eta]$ (unit: dl/g) is measured in a decalin solution at 135° C.

The acid modified polyolefin has an acid value of 40 to 150, particularly preferably 50 to 130. When the acid value is too low, the emulsifiability of the polyolefin mixed particles are lowered and the average particle diameter of the dispersoid in the resulting aqueous dispersion becomes large. When the acid value is too high, the hydrophilic properties become too high and thereby the water resistance is lowered. The acid value is an amount in mg of potassium hydroxide, which is used for neutralizing 1 g of the acid modified polyolefin.

Methods employable for grafting the unsaturated carboxylic acid on polyolefin include known methods, and are not particularly limited. For example, the unsaturated carboxylic acid is grafted on polyolefin by a method of dissolving a polyolefin in a solvent and then performing reaction with heat and stirring in the presence of an organic peroxide.

Examples of the organic peroxide are benzoyl peroxide, lauroyl peroxide, azobisisobutylonitrile, dicumyl peroxide, α,α'-bis(t-butyl peroxydiisopropyl)benzene, 2,5,-dimethyl-2,5-di(t-butylperoxy)hexane, 2,5-dimethyl-2,5-di(t-butylperoxy)hexyne-3, di-t-butylperoxide, cumenhydroperoxide and t-butylhydroperoxide. The amount of the organic peroxide added is not particularly limited, and is usually 0.005 to 5 parts by mass, preferably 0.01 to 1 part by mass per 100 parts by mass of the polyolefin.

The acid modified polyolefin in which the unsaturated carboxylic acid is grafted may be obtained by sufficiently mixing the above polyolefin, unsaturated carboxylic acid and organic peroxide with a tumbler, Henschel mixer, or the like, melt kneading the mixture at a temperature of not lower than the melting point of the polyolefin, usually at a temperature of not lower than the melting point and not higher than 280° C., and thereby performing grafting reaction. The melt kneading method is not particularly limited. For example, melt kneading may be carried out using a screw extruder, a Banbury mixer or a mixing roll. For simple and easy procedure, it is preferred to use the screw extruder. The temperature and the time for melt kneading are varied, depending on the decomposition temperature of the organic peroxide used. In general, the melt kneading is properly carried out at a temperature of 160 to 280° C. for 0.3 to 30 min, preferably at a temperature of 170 to 250° C. for 1 to 10 min.

As the acid modified polyolefin, acid modified polyethylene and acid modified polypropylene are more preferable and further acid modified polyethylene is particularly preferable.

The resin layer formed from the acid modified polyolefin-containing coating material prepared by using the acid modified polyolefin has excellent properties such as chemical resistance, adhesion and flexibility.

As for the content rate of the polyolefin and the acid modified polyolefin in the polyolefin mixed particles, the amount of the acid modified polyolefin is 1 to 99 parts by mass, preferably 1 to 50 parts by mass based on 100 parts by mass of the polyolefin.

The dispersoid of the aqueous dispersion (B) is preferably acid modified polyolefin particles. The acid modified polyolefin constituting the dispersoid of the aqueous dispersion (B) is not particularly limited as long as within the object of the present invention. Examples thereof are those as described in the acid modified polyolefin constituting the dispersoid of the aqueous dispersion (A). Among them, acid modified polyethylene and acid modified polypropylene are preferable and acid modified polyethylene is particularly preferable.

The resin layer formed from the acid modified polyolefin-containing coating material prepared by using the acid modified polyolefin has excellent properties such as chemical resistance, adhesion and flexibility. Particularly, since acid modified polyethylene has a low melting point, low temperature baking can be carried out in coating.

The dispersing medium of the aqueous dispersion (A) or (B) is preferably at least one selected from the group consisting of water and alcohols having 1 to 4 carbon atoms, more preferably at least one of selected from the group consisting of water and alcohols having 1 to 3 carbon atoms.

Examples of alcohols having 1 to 4 carbon atoms, which are not particularly limited as long as within the object of the present invention, are methanol, ethanol, isopropanol, ethylene glycol and butanol.

Examples of the dispersing medium of the aqueous dispersion (A) are more preferably water, an alcohol having 1 to 4 carbon atoms or a mixed solvent thereof, furthermore preferably water, an alcohol having 1 to 3 carbon atoms or a mixed solvent thereof, particularly preferably water.

Examples of the dispersing medium of the aqueous dispersion (B) are more preferably water, an alcohol having 1 to 4 carbon atoms or a mixed solvent thereof, further more preferably water, an alcohol having 1 to 3 carbon atoms or a mixed solvent thereof, particularly preferably water and isopropanol.

As the dispersing medium of the aqueous dispersion (A) or (B), these solvents are preferably used from the viewpoint that the environmental load can be decreased.

The aqueous dispersion (A) preferably has a solid content concentration of 1 to 60% by mass, more preferably 20 to 50% by mass, particularly preferably 30 to 40% by mass. The aqueous dispersion (B) preferably has a solid content concentration of 1 to 60% by mass, more preferably 3 to 55% by mass, particularly preferably 10 to 45% by mass.

Next, the process for producing the aqueous dispersions (A) and (B) will be described.

The process for producing the aqueous dispersions (A) and (B) is not particularly limited. Processes employable include a process of heating and stirring each of the above components, namely, the dispersoids such as polyolefin and acid modified polyolefin, etc., the dispersing mediums such as water, an alcohol having 1 to 4 carbon atoms, etc. and optionally a basic compound etc., in a vessel capable of being sealed. This process is most preferable. According to this process, it is particularly unnecessary to add a surfactant. Furthermore, by adding the basic compound, a part or all of carboxyl groups in the acid modified polyolefin are neutralized and electric repulsion among carboxyl anions generated prevents fine particles from aggregation, thereby giving stability to the aqueous dispersion. Examples of the basic compound, which is not particularly limited, are an oxide, hydroxide or hydride of an alkali metal or an alkali earth metal, and a compound of ammonium or amine. The basic compound is preferably added in an amount of 0.5 to 3.0 times by equivalent weight, more preferably 0.8 to 2.5 times by equivalent weight, particularly preferably 0.9 to 2.0 times by equivalent weight based on carbonyl groups in the acid modified polyolefin. When the amount of the basic compound is less than 0.5 time by equivalent weight, the effect of adding the basic compound is not confirmed. When it is over 3.0 times by equivalent weight, the drying time is prolonged in resin layer forming or the stability of the aqueous dispersion is occasionally lowered.

As a vessel, devices widely known as a solid/liquid stirring device or emulsifying device in persons skilled in the art are employable. It is preferred to use a device capable of applying a pressure to 0.1 MPa or more. The stirring method and the rotation rate for stirring are not particularly limited. The stirring may be carried out at a low rate such that the dispersoid is in a suspended state in the dispersing medium. It is unnecessary to stir at a high rate (for example, 1,000 rpm or more). The production of the aqueous dispersion can therefore be performed even by a simple device.

To the device, the raw materials including the dispersoids such as polyolefin, acid modified polyolefin, etc. and the dispersing mediums such as water, an alcohol having 1 to 4 carbon atoms, etc. are fed and preferably mixed while stirring at a temperature of not higher than 40° C. Subsequently, the stirring is continued preferably until coarse particles disappear (for example, for 5 to 120 min), while keeping the temperature inside the vessel at a temperature of 60 to 220° C., preferably 80 to 200° C., more preferably 100 to 190° C., particularly preferably 100 to 180° C. Through the stirring, the dispersoid is sufficiently dispersed in the dispersing medium and then cooled, preferably under stirring to a temperature of not higher than 40° C., to prepare the aqueous dispersion. When the temperature of the vessel inside is lower than 60° C., it is difficult to sufficiently disperse the dispersoid in the dispersing medium. When the temperature of the vessel is over 220° C., it is likely to cause decrease in the molecular weight of the dispersoid.

Thereafter, a jet grinding treatment, further, may be carried out if necessary. The jet grinding treatment is to make the dispersoid particles into finer particles with mechanical energy, by jetting the aqueous dispersion through a pore such as nozzle or slit under a high pressure to allow the dispersoid particles to collide with each other and to allow the dispersoid particles and a collision plate etc. to collide with each other. Examples of devices for the treatment are homogenizer manufactured by A.P.V. GAULIN and microfluitizer M-110 E/H manufactured by Mizuho Industrial Co., Ltd.

The average particle diameters of the dispersoids of the aqueous dispersions (A) and (B) can be regulated by the above method, but it is technically difficult to prepare a dispersoid having an average particle diameter of less than 0.01 µm.

As the method of regulating the solid content concentration of the aqueous dispersion thus prepared, there may be mentioned a method of distilling off the dispersing medium so that the aqueous dispersion has a desired solid content concentration and a method of distilling the aqueous dispersion with water.

Employing the above production process, the aqueous dispersion for use in the present invention is prepared in a uniform liquid state in which the dispersoid dispersed or dissolved in the dispersing medium. Herein, the uniform liquid state means a state that a part where the solid content concentration is locally different from other parts, for example, precipitation, phase separation or skinning, apparently cannot be observed in the aqueous dispersion. When the average particle diameter of the dispersoid of the aqueous dispersion (A) is over the above limit value, it is hard to prepare an aqueous dispersion in a uniform liquid state.

As a method of mixing the aqueous dispersions (A) and (B), a method of using a usual mixing device may be used in the present invention. Examples of the mixing devices may include mixing devices such as impeller, dissolver, homogenizer, homo-mixer, etc. and dispersing devices such as paint shaker, ball mill, sand mill, attractor, roll mill, kneader, etc.

Furthermore, as a method of regulating the solid content concentration after mixing, there may be mentioned a method of distilling off the dispersing medium so that the aqueous dispersion has a desired solid content concentration or a desired viscosity and a method of diluting the aqueous dispersion with water.

Further, the coating material of the present invention preferably comprises the solvent in an amount of not more than 20% by mass, more preferably not more than 15% by mass, particularly preferably not more than 10% by mass. The lower limit of the amount of the solvent contained is preferably 1% by mass. The solvent is preferably a water-soluble organic compound having a boiling point of 100 to 200° C. Examples of the solvent are 1-butanol, isobutanol, etc. Among them, 1-butanol is particularly preferable. The coating material preferably contains such a solvent in an amount within the range, from the viewpoint of prevention of nozzle clogging and the viewpoint of control of drying rate for the coating material.

To the coating material of the present invention, a crosslinking agent, an inorganic particle, etc. may be added. The addition of them is preferable because they improve the chemical resistance and heat resistance of the resin layer formed. The crosslinking agent, inorganic particle, etc. are preferably added at the time of preparing the coating material.

Examples of the crosslinking agents are an organic-peroxide, an isocyanate compound, a silane coupling agent, etc. The crosslinking agent is preferably added in an amount of 0.01 to 80 parts by mass, more preferably 0.1 to 50 parts by mass, preferably 0.5 to 30 parts by mass based on 100 parts by mass of the total of the dispersoids.

Examples of the inorganic particles are silica, alumina, etc. The inorganic particles are preferably added in an amount of not more than 30 parts by mass, more preferably not more than 20 parts by mass, preferably not more than 10 parts by mass based on 100 parts by mass of the total of the dispersoids.

The coating material of the present invention may be colored by adding an organic pigment or an inorganic pigment.

The pigment is preferably added in an amount of not more than 2 parts by mass, more preferably not more than 1 part by mass, preferably not more than 0.5 part by mass based on 100 parts by mass of the total of the dispersoids.

The coating material of the present invention may contain other aqueous dispersions in addition to the aqueous dispersions (A) and (B) as long as within the object of the present invention.

The coating material of the present invention may contain other additives as long as within the object of the present invention.

The coating material of the present invention substantially does not contain a surfactant, preferably. The description "the coating material substantially does not contain a surfactant" means that the surfactant is not used in the production of the coating material and as a result, the resulting coating material does not contain the surfactant. Accordingly, the coating material desirably has a surfactant content of zero in particular. However, it may contain the surfactant in a slight amount within the limit of not missing the effect of the present invention. When the coating material substantially not containing the surfactant is used, the surfactant does not remain in the resin layer formed from the coating material and there is no possibility that a detrimental substance (for example, bisphenol A etc.) derived from the surfactant adversely affects on contents and the like.

The coating material of the present invention preferably has a viscosity, as determined with use of a flow cup No. 3 in accordance with JIS K5600-2-2, of 80 to 400 sec, more preferably 90 to 200 sec, furthermore preferably 90 to 170 sec, particularly preferably 120 to 150 sec. The viscosity is preferably in the above range because the coating material has excellent paintability. For example, in the case that coating is performed with use of a spray gun, clogging of a nozzle for injecting the coating material and liquid sagging are suppressed, with the result that the paintability are very excellent. Furthermore, the frequency of cleaning the spray gun can be decreased vastly and the viscosity in the range is preferable also from the viewpoints of economic properties and efficiency. Particularly, when the inner surface of an aluminum tube whose mouth is a closed film is coated with the spray gun, a good resin layer can be formed even in the closed film part of the mouth where it is difficult to be coated.

The coating material of the present invention can be suitably used in order to form a protective layer on the inner surface of a container. Particularly, the coating material can be suitably used in order to form a protective layer on the inner surface of an aluminum tube.

The container of the present invention has a characteristic such that the layer (X) obtained by coating the above coating material on the inner surface of the container is formed. Since the layer (X) is formed from the above coating material, it has excellent chemical resistance, crack resistance, vapor barrier properties and the like. Such a container is suitable to contain and preserve, for example, chemicals, cosmetics, foods, hair conditioners, hair colors or adhesives. The layer (X) formed on the inner surface of the container can suppress corrosion caused by the content of the container.

The container is preferably made of a metal, more preferably iron or a light metal, particularly preferably aluminum. The container is preferably made of any of these metals because the adhesion and the follow properties between the layer (X) and the inner surface of the container are particularly excellent.

Examples of the containers are tubes and cans. Among them, the tubes are more preferable. For example in the case of a metal tube, even after the content is pressed out from the mouth by pressing the body part, the body part can keep the pressed shape. Accordingly, in the use thereof, the air hardly enters into the inside of the tube and thereby change of properties and deterioration in the content are inhibited. Furthermore, the tube has excellent workability. Moreover, since the inner surface of the metal tube is covered with the above layer (X), the corrosion of the tube caused by the content can be suppressed. Such a metal tube is preferably used for containing and preserving a paste content or the like, examples of which include chemicals, cosmetics, foods, hair conditioners, hair colors or adhesives, and also is convenient to carry.

The mouth of the tube is particularly preferably a closed film. The closed film in the mouth exerts an effect of preventing the content from tampering. In the case of aluminum tube having a closed film in the mouth, the adhesion and the following properties between the layer (X) and the inner surface of the aluminum tube, particularly the closed film part of the mouth, are excellent so that the closed film of the mouth can be favorably opened.

The layer (X) preferably has a thickness of 2 to 50 µm, more preferably 5 to 40 µm, particularly preferably 10 to 30 µm. The layer (X) preferably has a thickness in the above range from the viewpoints of the chemical resistance and expanding properties. When the dispersoids of the aqueous dispersions (A) and (B) used in the coating material have an average particle diameter in the above range, the uniform layer (X) having a thickness in the above range can be favorably formed.

The amount of the coating material applied is selected appropriately in accordance with the use. The coating material is applied in an amount after drying of preferably 4.6 to 36.8 $g/m^2$, more preferably 9.2 to 27.6 $g/m^2$, particularly preferably 13.8 to 23.0 $g/m^2$. When the film is formed by applying the coating material in the above amount, the resin layer having excellent uniform properties can be obtained.

As the method of forming the layer (X) by applying the coating material on the inner surface of the container, various coating methods such as a spray method, a dipping method and other methods are employable. Among them, the spray method is preferable. The layer (X) is favorably formed by the coating method using a spray gun in particular.

FIG. 1 is a view showing one example of the method of forming the above-described layer (X) using a spray gun. Hereinafter, the method of forming the layer (X) will be described on the basis of FIG. 1. At first, a tube is fixed on a holder and the holder is rotated at a high rate. Subsequently, the tip of the spray gun is inserted into the rotating tube. Thereafter, the above-described coating material is injected from the tip of the spray gun and thereby is sprayed on the inner surface of the tube to form the layer (X). The uniform layer can be formed by such a method. The layer (X) formed is subjected to drying and baking to prepare the tube whose inner surface is coated with the coating material. The drying temperature, which is not particularly limited, is usually 100 to 200° C., preferably 130 to 180° C. The baking temperature, which is not particularly limited, is usually 140 to 210° C., preferably 150 to 200° C. The drying time, which is not particularly limited, is usually 5 to 15 min, preferably 7 to 10 min. The baking time, which is not particularly limited, is usually 5 to 15 min, preferably 7 to 10 min.

EXAMPLE

Hereinafter, the present invention will be described in more detail with reference to the following examples, but it should not be limited to the examples.

<Preparation of Coating Material>

(Coating Material 1)

CHEMIPEARL™ M200 manufactured by Mitsui Chemical Inc. (dispersoid: particles formed from polyethylene and acid modified polyolefin, solid content concentration: 40% by mass, and dispersing medium: water) was taken as a coating material 1.

(Coating Material 2)

ARROWBASE™ SD1200 manufactured by Unitika Ltd. (dispersoid: modified polyethylene particles, solid content concentration: 20% by mass, and dispersing medium: water and isopropanol) was taken as a coating material 2.

(Coating Material 3)

The coating material 3 was prepared by stirring and mixing the coating material 1 (10 parts by mass) and the coating material 2 (1 part by mass) for 30 min by an impeller stirring machine. The mass ratio of the dispersoid of the coating material 1 to the dispersoid of the coating material 2 (coating material 1/coating material 2) was 20/1.

(Coating Material 4)

The coating material 4 was prepared by stirring and mixing the coating material 1 (10 parts by mass) and the coating material 2 (1 part by mass) for 30 min by an impeller stirring machine, adding 1-butanol so that the amount thereof was 7% by mass based on the total of the coating material components and performing stirring for 30 min. The mass ratio of the dispersoid of the coating material 1 to the dispersoid of the coating material 2 (coating material 1/coating material 2) was 20/1.

(Coating Material 5)

The coating material 5 was prepared by stirring and mixing the coating material 1 (20 parts by mass) and the coating material 2 (1 part by mass) for 30 min by an impeller stirring machine, adding 1-butanol so that the amount thereof was 5.75% by mass based on the total of the coating material components and performing stirring for 30 min. The mass ratio of the dispersoid of the coating material 1 to the dispersoid of the coating material 2 (coating material 1/coating material 2) was 40/1.

(Coating Material 6)

The coating material 6 was prepared by stirring and mixing the coating material 1 (5 parts by mass) and the coating material 2 (1 part by mass) for 30 min by an impeller stirring machine, adding 1-butanol in so that the amount thereof was 6% by mass based on the total of the coating material components and performing stirring for 30 min. The mass ratio of the dispersoid of the coating material 1 to the dispersoid of the coating material 2 (coating material 1/coating material 2) was 10/1.

(Coating Material 7)

ZAIKTHENE™ manufactured by Sumitomo Chemicals Co., Ltd. (dispersoid: ethylene-ammonium acrylate copolymer, solid content concentration: 24% by mass, and dispersing medium: water) was taken as a coating material 7.

[Method of Measuring Average Particle Diameter]

Coating Material 1

The average particle diameter of the dispersoid of the coating material 1 was measured using a leaser diffraction/scattering particle size distribution measuring device LA-920 manufactured by Horiba Seisakusho Co., Ltd. The average particle diameter was 4.12 μm.

Coating Material 2

The average particle diameter of the dispersoid of the coating material 2 was measured in the same manner as applied to the coating material 1. The average particle diameter was 0.12 μm.

Coating Material 7

The average particle diameter of the dispersoid of the coating material 7 was measured in the same manner as applied to the coating material 1. The average particle diameter was 0.10 μm.

Examples 1-4 and Comparative Examples 1-3

The coating material 3, the coating material 4, coating material 5 and coating material 6 were taken as Example 1, Example 2, Example 3 and Example 4, respectively, and further the coating material 1, coating material 2 and coating material 7 were taken as Comparative Example 1, Comparative Example 2 and Comparative Example 3, respectively. Each of the coating materials was evaluated as follows.

[Method of Measuring Viscosity]

The viscosity of each of the coating materials 1 to 7 was measured in the following manner.

The viscosity of each coating material was measured using a flow cup No. 3 as described in JIS K5600-2-2 in accordance with the measuring conditions as described in JIS5600-2-2. The measurement results are shown in Table 1.

The coating material 1 and coating material 7 have a high viscosity so that the viscosity measurement in accordance with JIS K5600-2-2 could not be carried out.

TABLE 1

| | | Coating material 1 | Coating material 2 | Coating material 3 | Coating material 4 | Coating material 5 | Coating material 6 | Coating material 7 |
|---|---|---|---|---|---|---|---|---|
| Second | | Measurement could not be performed | 93 | 354 | 119 | 124 | 88 | Measurement could not be performed |

<Production of Container>

Each of the coating materials 1 to 7 was applied by spraying by means of a fluid type auto-spay gun on the inner surface of an aluminum tube formed by impact press. Subsequently, the coating material coated on the inner surface of the aluminum tube was subjected to drying and baking in a drying furnace set at 200° C. to prepare a container.

<Evaluation of Resin Layer>

(1) Chemical Resistance

Regarding the resin layers formed from the coating materials 1 to 7, the chemical resistance test was carried out in the following manner.

(Testing Method)

On the surface of a plate-like substrate prepared by cutting through the aluminum tube (inner surface of the tube), each of the coating materials 1 to 7 was applied using a bar coater No. 24. Subsequently, the substrate was dried at 180° C. for 10 min to form a resin layer (thickness of the resin layer: about 20 μm) on the substrate (6 substrates was prepared for each coating material). On the all surface of the resin layer after drying, a reagent with the following composition was applied as one example of contents which were assumed as an ointment to prepare a laminate in which the resin layer and the reagent layer were formed in that order on the substrate.

(Composition of Reagent for Chemical Resistance Test)

| | |
|---|---|
| White Vaseline | 86% |
| Liquid paraffin | 5% |
| Dissolving agent | 5% |
| Surfactant | 4% |

The two laminates were superimposed each other in such a state that the regent-coated surfaces thereof faced each other inwardly. The laminates were kept in a constant-temperature bath at 40° C. for 3 months, and thereafter the condition of the resin layers was confirmed visually. In the confirmation, the reagent was wiped off from the resin layer in such a way that the resin layer surfaces were not scratched. The results are shown in Table 2.

TABLE 2

(Results of Chemical resistance test)

| Kind of Coating material | Condition of Resin layer |
|---|---|
| Coating material 1 | No change after 3 months |
| Coating material 2 | No change after 3 months |
| Coating material 3 | No change after 3 months |
| Coating material 4 | No change after 3 months |
| Coating material 5 | No change after 3 months |
| Coating material 6 | No change after 3 months |
| Coating material 7 | The resin layer was degraded after about 1 week |

(2) Paintability

The coating materials 1 to 7 were each applied on the inner surfaces of the aluminum tubes by a spray gun (thickness of the resin layer: about 20 μm). Regarding each coating material, the paintability and the appearance of the resin layer formed were observed visually. The results are shown in Table 3.

TABLE 3

Spray handling properties of each coating material and Appearance of the resin layer

| Kind of Coating material | Paintability | Appearance of the resin layer | Decision by ○ and X |
|---|---|---|---|
| Coating material 1 | Nozzle was easily clogged and the spray coating was difficult. | A Stilliform resin layer was formed due to liquid cissing. | X (reject) |
| Coating material 2 | The coating material was easily sagged. | Bubbles were generated. | X (reject) |
| Coating material 3 | Paintability was good. | A uniform resin layer was formed. | ○ (good) |
| Coating material 4 | Paintability was good. | A uniform resin layer was formed. | ○ (good) |
| Coating material 5 | Paintability was good. | A uniform resin layer was formed. | ○ (good) |
| Coating material 6 | Paintability was good. | A uniform resin layer was formed. | ○ (good) |
| Coating material 7 | The coating material was easily sagged. | Bubbles were generated. | X (reject) |

The invention claimed is:

1. A coating material comprising a first aqueous dispersion (A), a second aqueous dispersion (B), and a solvent in an amount of 1 to 20% by mass,
   wherein a dispersoid of the first aqueous dispersion (A) has an average particle diameter of 1 to 20 μm,
   a dispersoid of the second aqueous dispersion (B) has an average particle diameter 1/100 to 1/5 of that of the dispersoid of the first aqueous dispersion (A), and
   the mass ratio of the dispersoid of the first aqueous dispersion (A) to the dispersoid of the second aqueous dispersion (B) is 2/1 to 100/1,
   the dispersoid of the first aqueous dispersion (A) is particles formed from a polyolefin and an acid modified polyolefin,
   the dispersoid of the second aqueous dispersion (B) comprises acid modified polyolefin particles, and
   the solvent is a water-soluble organic compound having a boiling point of 100° C. to 200° C.

2. The coating material according to claim 1, wherein a dispersion medium of the first aqueous dispersion (A) is at least one selected from the group consisting of water and alcohols having 1 to 4 carbon atoms.

3. The coating material according to claim 1, wherein a dispersion medium of the second aqueous dispersion (B) is at least one selected from the group consisting of water and alcohols having 1 to 4 carbon atoms.

4. The coating material according to claim 1, which substantially does not contain a surfactant.

5. The coating material according to claim 1, which has a viscosity, as determined by a flow cup No. 3 in accordance with JIS K5600-2-2, of 80 to 400 sec.

6. A container having a layer (X) formed by applying the coating material as claimed in claim 1 on an inner surface of the container.

7. The container according to claim 6, which is made of a metal.

8. The container according to claim 6, which is made of aluminum.

9. The container according to claim 6, which is a tube.

10. The container according to claim 9, wherein the tube has a mouth, which is a closed film.

11. The container according to claim 6, wherein the layer (X) has a thickness of 2 to 50 μm.

12. The container according to claim 6, wherein the layer (X) is formed by a coating method using a spray gun.

* * * * *

UNITED STATES PATENT AND TRADEMARK OFFICE
CERTIFICATE OF CORRECTION

PATENT NO.      : 8,394,884 B2  
APPLICATION NO. : 13/002257  
DATED           : March 12, 2013  
INVENTOR(S)     : Kotori et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 62 days.

Signed and Sealed this

First Day of September, 2015

Michelle K. Lee  
*Director of the United States Patent and Trademark Office*